(12) United States Patent
Moriuchi et al.

(10) Patent No.: US 8,129,619 B2
(45) Date of Patent: Mar. 6, 2012

(54) FLAME-RETARDANT RESIN COMPOSITION, AND INSULATED WIRE, INSULATED SHIELDED WIRE, INSULATED CABLE AND INSULATION TUBE USING THE SAME

(75) Inventors: Kiyoaki Moriuchi, Osaka (JP); Hiroshi Hayami, Osaka (JP); Satoshi Yamasaki, Osaka (JP); Jo Yagisawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 149 days.

(21) Appl. No.: 12/085,164

(22) PCT Filed: Nov. 20, 2006

(86) PCT No.: PCT/JP2006/323115
§ 371 (c)(1),
(2), (4) Date: Oct. 14, 2008

(87) PCT Pub. No.: WO2007/058349
PCT Pub. Date: May 24, 2007

(65) Prior Publication Data
US 2009/0255707 A1 Oct. 15, 2009

(30) Foreign Application Priority Data
Nov. 21, 2005 (JP) ................................ P2005-336269

(51) Int. Cl.
*H01B 7/00* (2006.01)
(52) U.S. Cl. ............ 174/110 R; 174/120 R; 174/120 SR
(58) Field of Classification Search .............. 174/110 R, 174/110 AR, 110 SR, 110 FC, 113 R, 120 R, 174/120 C
See application file for complete search history.

(56) References Cited

U.S. PATENT DOCUMENTS

| | | | | |
|---|---|---|---|---|
| 5,013,782 | A * | 5/1991 | Tateno | 524/417 |
| 5,650,205 | A * | 7/1997 | Shukushima | 428/35.8 |
| 5,936,037 | A * | 8/1999 | Tasaka | 525/92 B |
| 6,017,987 | A * | 1/2000 | Okisaki et al. | 524/408 |
| 6,064,002 | A * | 5/2000 | Hayami et al. | 174/564 |
| 6,646,047 | B2 * | 11/2003 | Tasaka et al. | 525/92 B |
| 2004/0097650 | A1 * | 5/2004 | Ogawa et al. | 525/98 |

FOREIGN PATENT DOCUMENTS

| | | |
|---|---|---|
| JP | 4-154853 | 5/1992 |
| JP | 5-117416 | 5/1993 |
| JP | 7-216144 | 8/1995 |
| JP | 2001-261854 | 9/2001 |
| JP | 2001-316533 | 11/2001 |
| JP | 2002-302602 | 10/2002 |
| JP | 2004-10840 | 1/2004 |
| JP | 2004-51903 | 2/2004 |

OTHER PUBLICATIONS

Japanese Office Action, with English Translation, issued in Japanese Patent Application No. 2007-545333, dated Jul. 28, 2009.
International Preliminary Report on Patentability and Written Opinion of the International Searching Authority, issued in corresponding International Patent Application No. PCT/JP2006/323115, mailed Jun. 5, 2008.

* cited by examiner

*Primary Examiner* — William Mayo, III
(74) *Attorney, Agent, or Firm* — McDermott Will & Emery LLP

(57) ABSTRACT

A flame-retardant resin composition including a resin component containing (A) 30 to 90 parts by weight of a thermoplastic polyurethane elastomer having, as measured according to JIS K 7311, a JIS hardness of A98 or less, (B) 70 to 10 parts by weight of an ethylene-vinyl acetate copolymer having a vinyl acetate unit content of 50 to 90% by weight, (C) 0 to 40 parts by weight of at least one polymer selected from the following copolymers (C1) to (C3), (C1) an acid anhydride-modified ethylene-unsaturated carboxylic acid derivative copolymer, (C2) an epoxy group-having ethylene-olefin copolymer, and (C3) an acid anhydride-modified styrene elastomer, and provided that the total amount of components (A), (B) and (C) is 100 parts by weight, (D) a metal hydroxide in a ratio of 40 to 250 parts by weight with respect to the total amount of 100 parts by weight of the resin component containing (A), (B) and (C).

21 Claims, No Drawings

FLAME-RETARDANT RESIN COMPOSITION, AND INSULATED WIRE, INSULATED SHIELDED WIRE, INSULATED CABLE AND INSULATION TUBE USING THE SAME

RELATED APPLICATIONS

This application is the U.S. National Phase under 35 U.S.C. §371 of International Application No. PCT/JP2006/323115, filed on Nov. 20, 2006, which in turn claims the benefit of Japanese Patent Application No. JP 2005-336269, filed on Nov. 21, 2005, the disclosures of which Applications are incorporated by reference herein.

TECHNICAL FIELD

The present invention relates to a flame-retardant resin composition, and more specifically, to a flame-retardant resin composition including a thermoplastic polyurethane elastomer and an ethylene-vinyl acetate copolymer as a resin component but not including a halogen flame retardant by using a metal hydroxide as a flame retardant, and from which a coating layer having high flame retardancy and excellent mechanical properties, heat resistance, heat aging resistance, heat deformation resistance, low-temperature characteristics (low-temperature flexibility) and electrical insulating properties.

The present invention also relates to an insulated wire, an insulated shielded wire and an insulated cable, each having a coating layer formed from the flame-retardant resin composition. The present invention further relates to an insulation tube formed from the flame-retardant resin composition.

BACKGROUND ART

In various electric wires such as insulted wires, shielded wires and insulated cables, the conductor or the outer coating is insulation-coated with an insulating material. As the insulating material for wires such as insulated wires or insulated cables for use for inner wiring in electronic appliances, generally used are a polyvinyl chloride resin and a polyolefin resin composition containing a flame retardant. The polyolefin resin is typically an ethylene copolymer such as ethylene-vinyl acetate copolymer and ethylene-ethyl acrylate copolymer. As the flame retardant, generally used is a halogen flame retardant containing a bromine atom or a chlorine atom in the molecule. A bromine flame retardant having a bromine atom in the molecule, which is one of a type of the halogen flame retardant, has a high flame-retarding effect, and in general, it attains flame retardation, taking advantage of the synergistic effect with antimony trioxide combined with it. The bromine flame retardant is highly effective, when combined with a phosphorus compound.

However, when wires coated for insulation with a coating material such as a polyvinyl chloride resin or a polyolefin resin containing a halogen flame retardant are discarded, the plasticizer, the heavy metal stabilizer and the phosphorus compound contained in the coating material may dissolve out to pollute the environment. In addition, when the wires insulation-coated with such a coating material are incinerated, the halogen compound contained in the coating material may generate corrosive gases and dioxins.

For good approach to the increasing requirement for environmental load reduction these days, halogen-free wires have been developed, which use a coating material not containing a polyvinyl chloride resin and a halogen flame retardant. On the other hand, in general, wires such as insulated wires and insulated cables for use for inner wiring in electronic appliances are required to have various characteristics satisfying the UL (Underwriters Laboratories Inc.) standard. The UL standard defines in detail various characteristics that products must satisfy, such as flame retardancy, thermal deformation, low-temperature characteristics, and initial and thermally-aged tensile characteristics of coating materials. Regarding the flame retardancy of those, products must pass a vertical wire flame test called a VW-1 test, and this is one of the severest requirements of the UL standard.

In general, as a coating material for halogen-free wires, there is used a flame-retardant resin composition including a polyolefin resin with a metal hydroxide (also called as a metal hydrate) such as magnesium hydroxide or aluminium hydroxide added thereto. However, the flame-retarding effect of metal hydroxide is low as compared with a halogen flame retardant, and therefore, for making it to pass the vertical wire flame test VW-1, a large amount of metal hydroxide must be added to polyolefin resin. As a result, the tensile characteristics (such as tensile strength and tensile elongation at break) and the heat deformation resistance of coating materials may greatly worsen.

When a coating layer of a resin composition including a polyolefin resin and a metal hydroxide is crosslinked through irradiation with ionizing radiations such as accelerated electron beams, then its tensile characteristics and heat deformation resistance may be improved. However, the halogen-free flame-retardant resin composition mentioned above is more expensive than polyvinyl chloride resin and, in addition, it has another drawback in that its production cost further increases since an expensive irradiation apparatus is necessary for irradiation with ionizing radiations. Accordingly, it is desired to develop a halogen-free wire capable of satisfying the UL standard even in the absence of crosslinking treatment.

Heretofore, as a halogen-free flame retardant resin composition, there is proposed a transmission line-coating resin composition including a resin component containing an ethylene copolymer and a polyester elastomer and a large amount of a metal hydride added thereto (Patent Document 1). As the ethylene copolymer, used is an ethylene-vinyl acetate copolymer having a vinyl acetate content of 25 to 85% by mass. However, the polyester elastomer-containing flame-retardant resin composition disclosed in Patent Document 1 is not always satisfactory in point of its flame retardancy and insulation resistance and, in particular, its pass rate in the vertical wire flame test VW-1 is not high.

A flame-retardant resin composition is proposed, as prepared by melt-kneading a resin component containing an ethylene copolymer and a polyester-type and/or polyether-type segment-having thermoplastic resin, with an organic peroxide and a silane coupling agent-processed metal hydrate (Patent Document 2).

Patent Document 2 shows, for example, a thermoplastic polyester elastomer, a thermoplastic polyurethane elastomer and a thermoplastic polyamide elastomer, as the polyester-type and/or polyether-type segment-having thermoplastic resin. However, even though a metal hydrate is added to the resin composition that contains a thermoplastic polyurethane elastomer (DIC Bayer Polymer's trade name, "T-8180N") and an ethylene-vinyl acetate copolymer having a vinyl acetate content of 41% by weight (Mitsui DuPont's trade name, "Evaflex EV40LX") shown in Examples of Patent Document 2, it is difficult to obtain a resin composition having excellent flame retardancy, mechanical properties, heat resistance, heat aging resistance and heat deformation resistance, and in particular, it is extremely difficult to obtain a resin composition showing high flame retardancy that passes the vertical wire flame test VW-1.

Patent Document 1: JP 2004-10840 A
Patent Document 2: JP 2004-51903 A

DISCLOSURE OF THE INVENTION

Problems to be Solved by the Invention

An object of the present invention is to provide a flame-retardant resin composition capable of forming a coating layer having excellent mechanical properties, heat resistance, heat aging resistance, heat deformation resistance, low-temperature characteristics and electrical insulating properties, showing high flame retardancy that passes the vertical wire flame test VW-1 in the UL standard, even without containing a halogen flame retardant.

The inventors of the present invention have assiduously studied to solve the above-mentioned problems, and as a result, have found that, when a resin component containing a thermoplastic polyurethane elastomer having a hardness falling within a specific range and an ethylene-vinyl acetate copolymer having a vinyl acetate unit content falling within a specific range, in a specific ration, is combined with a specific amount of a metal hydroxide added thereto, then a flame-retardant resin composition can be obtained capable of forming a coating layer showing high flame retardancy that passes the vertical wire flame test VW-1 of the UL standard and having excellent mechanical properties (such as tensile strength and tensile elongation at break), heat resistance, heat aging resistance, heat deformation resistance, low-temperature characteristics and electrical insulating properties, even though it is not subjected to crosslinking treatment with ionizing radiations. Further, the inventors have found that a flame-retardant resin composition having further more favorable characteristics can be obtained by adding, to the resin component, an acid anhydride-modified ethylene-unsaturated carboxylic acid copolymer or an epoxy group-having ethylene-α-olefin copolymer or an acid anhydride-modified styrene elastomer in a specific ratio.

The flame-retardant resin composition according to the present invention shows excellent characteristics as a coating layer for insulated wires, insulated cables and insulated shielded wires. The flame-retardant resin composition according to the present invention may be formed into an insulation tube. The insulation tube according to the present invention may be favorably used for jointing or insulating protection of insulated wires and insulated cables. The present invention has been made in view of these findings.

Means for Solving the Problems

According to an aspect of the present invention, there is provided a flame-retardant resin composition including a resin component containing (A) a thermoplastic polyurethane elastomer having, as measured according to JIS K 7311, a JIS hardness of A98 or less, and (B) an ethylene-vinyl acetate copolymer having a vinyl acetate unit content of 50 to 90% by weight, wherein a ratio by weight (A:B) is within a range of 40:60 to 90:10, and (D) a metal hydroxide in a ratio of 40 to 250 parts by weight with respect to 100 parts by weight of the resin component.

According to another aspect of the present invention, there is provided a flame-retardant resin composition including a resin component containing (A) 30 to 90 parts by weight of a thermoplastic polyurethane elastomer having, as measured according to JIS K 7311, a JIS hardness of A98 or less, (B) 70 to 10 parts by weight of an ethylene-vinyl acetate copolymer having a vinyl acetate unit content of 50 to 90% by weight, (C) 0 to 40 parts by weight of at least one polymer selected from the following copolymers (C1) to (C3), (C1) an acid anhydride-modified ethylene-unsaturated carboxylic acid copolymer, (C2) an epoxy group-having ethylene-olefin copolymer, and (C3) an acid anhydride-modified styrene elastomer, and provided that the total amount of components (A), (B) and (C) is 100 parts by weight, (D) a metal hydroxide in a ratio of 40 to 250 parts by weight with respect to the total amount of 100 parts by weight of the resin component containing (A), (B) and (C).

According to another aspect of the present invention, there are provided an insulated wire having, on a conductor, a coating layer formed from the flame-retardant resin composition, an insulated shielded wire having, as an outer sheath, a coating layer formed from the flame-retardant resin composition, and an insulated cable having, as an outer sheath of a single-core or multi-core insulated wire, a coating layer formed from the flame-retardant resin composition. Further, according to another aspect of the present invention, there is provided an insulation tube formed from the flame-retardant resin composition.

Effect of the Invention

According to the present invention, there is provided a flame-retardant resin composition capable of forming a coating layer showing high flame retardancy that passes the vertical wire flame test VW-1 of the UL standard and having excellent mechanical properties, heat resistance, heat aging resistance, heat deformation resistance, low-temperature characteristics and electrical insulating properties, even though it is not subjected to crosslinking treatment with ionizing radiations. Therefore, according to the present invention, there are provided an insulated wire, an insulated cable, an insulated shielded wire and an insulation tube having various excellent characteristics as above.

BEST MODE FOR CARRYING OUT THE INVENTION

A thermoplastic elastomer (TPE) is a polymer having both components of an elastic rubber component (soft segment) and a plastic deformation-preventing molecule-restraining component (hard segment) in the molecule.

The thermoplastic polyurethane elastomer (TPU) for use in the present invention is a polymer having an urethane group (—NH—COO—) in the molecule, which is formed through intermolecular reaction of three components of a high-molecular weight diol (long-chain diol), a diisocyanate, and a low-molecular weight diol (short-chain diol). The long-chain diol and the short-chain diol form a linear polyurethane through addition reaction with diisocyanate. Of those, the long-chain diol forms a soft moiety (soft segment) of the elastomer; and the diisocyanate and the short-chain diol form a hard moiety (hard segment). The basic characteristics of the thermoplastic polyurethane elastomer are determined mainly depending on the type of the long-chain diol; and the hardness thereof is controlled by the proportion of the hard segment.

The long-chain diol includes, for example, polypropylene glycol (PPG), polytetramethylene glycol (PTMG), poly(butylene adipate) diol (PBA), poly-ε-caprolactonediol (PCL), poly(hexamethylene carbonate) diol (PHC), poly(ethylene/1,4-adipate) diol, poly(1,6-hexylene/neopentylene adipate) diol. Regarding its type, the thermoplastic polyurethane elastomer may be grouped into, for example, caprolactone-type, adipate-type, PTMG-type or polycarbonate (PC)-type ones depending on the type of the long-chain diol.

The diisocyanate includes, for example, 4,4'-diphenylmethane diisocyanate, hexamethylene diisocyanate, isophorone diisocyanate, 4,4'-dicyclohexylmethane diisocyanate. The short-chain diol includes 1,4-butanediol, 1,6-hexanediol, 1,4-bis (2-hydroxyethoxy) benzene.

The thermoplastic polyurethane elastomer for use in the present invention has a hardness (unit=JIS; also called as "JIS A hardness"), as measured with a type A durometer according to JIS K 7311 (test method for polyurethane-type thermoplastic elastomer), of A98 or less. In case where the JIS hardness of the thermoplastic polyurethane elastomer is more than A98, then the tensile elongation at break of the flame-retardant resin composition may greatly lower, and when a coating layer is formed, it may lose flexibility. The JIS hardness of the thermoplastic polyurethane elastomer for use in the present invention is preferably from A50 to A96, more preferably from A60 to A95. The thermoplastic polyurethane elastomer having a JIS hardness that falls within the above range is favorable for attaining high-level balance of various characteristics of the flame-retardant resin composition, such as the mechanical properties, the heat resistance, the heat aging resistance, the heat deformation resistance and the low-temperature characteristics thereof.

The melt flow rate (abbreviated as "MFR"; measured according to JIS K 7210, at a temperature of 210° C. under a load of 5000 g), which may be an index of the molecular weight of the thermoplastic polyurethane elastomer for use in the present invention, is preferably from 0.1 to 100 g/10 min, more preferably from 0.5 to 50 g/10 min, from the viewpoint of the extrusion processability and the mechanical properties thereof.

The ethylene-vinyl acetate copolymer for use in the present invention is a copolymer of ethylene and vinyl acetate having a vinyl acetate unit content (may be simply referred to as a vinyl acetate content) of 50 to 90% by weight. In case where the vinyl acetate unit content of the ethylene-vinyl acetate copolymer is too low, then it may be difficult to obtain a resin composition having excellent flame retardancy and excellent mechanical properties, heat resistance, heat aging resistance and heat deformation resistance, and in particular, a resin composition showing high flame retardancy that passes the vertical wire flame test VW-1 could not be obtained. The vinyl acetate unit content is preferably from 55 to 85% by weight, more preferably from 60 to 83% by weight. When the ethylene-vinyl acetate copolymer for use in the present invention has a vinyl acetate unit content falling within the above range, a flame-retardant composition having excellent characteristics such as flame retardancy and tensile characteristics can be obtained.

MFR (measured according to JIS K 7210 at a temperature of 190° C. under a test load of 2160 g) of the ethylene-vinyl acetate copolymer for use in the present invention is preferably from 0.1 to 100 g/10 min, more preferably from 0.5 to 50 g/10 min, from the viewpoint of the extrusion processability and the mechanical properties. The acid anhydride-modified ethylene-unsaturated carboxylic acid derivative copolymer for use in the present invention is a copolymer prepared through modification of an ethylene-unsaturated carboxylic acid derivative copolymer with from 0.1 to 10% by weight of an acid anhydride (e.g., maleic anhydride). The unsaturated carboxylic acid derivative to copolymerize with ethylene includes, for example, vinyl acetate, ethyl acrylate, ethyl methacrylate. In general, the acid anhydride-modified ethylene-unsaturated carboxylic acid derivative copolymer has a Shore A hardness of 95 or less. The epoxy group-having ethylene-α-olefin copolymer includes a copolymer of ethylene and glycidyl methacrylate; a copolymer of ethylene, vinyl acetate and glycidyl methacrylate; and a copolymer of ethylene, methyl acrylate and glycidyl methacrylate. Those having a glycidyl methacrylate content of 1 to 15% by weight may apply. The acid anhydride-modified styrene elastomer is a styrene elastomer modified with from 0.1 to 10% by weight of an acid anhydride (e.g., maleic anhydride), in which the styrene elastomer is prepared by saturating the double bond of a block copolymer obtained through copolymerization of styrene with olefin (e.g., butadiene, ethylene/propylene), through hydrogenation.

In the present invention, used is a resin component containing (A) 30 to 90 parts by weight, preferably 40 to 80 parts by weight of a thermoplastic polyurethane elastomer, (B) 70 to 10 parts by weight, preferably 60 to 20 parts by weight of an ethylene-vinyl acetate copolymer and 0 to 40 parts by weight, preferably 0 to 30 parts by weight of at least one polymer selected from the following (C1) to (C3), (C1) an acid anhydride-modified ethylene-unsaturated carboxylic acid derivative copolymer or (C2) an epoxy group-having ethylene-α-olefin copolymer or (C3) an acid anhydride-modified styrene elastomer copolymer. Even when the ratio by weight of the thermoplastic polyurethane elastomer in the resin component is too high, the flame retardancy lowers and cannot pass the vertical wire flame test VW-1. When the ratio by weight of the ethylene-vinyl acetate copolymer lowers, then the flame retardancy may lower, and when it is high, the tensile elongation at break may lower. Further, when the ratio by weight of the acid anhydride-modified ethylene-unsaturated carboxylic acid derivative copolymer or the epoxy group-having ethylene-α-olefin copolymer or the acid anhydride-modified styrene elastomer copolymer is large, then the flame retardancy may lower and the tensile elongation at break may lower.

The metal hydroxide includes, for example, magnesium hydroxide and aluminium hydroxide. Of those, magnesium hydroxide is preferred in point of the flame retardancy. Not limited to a synthetic product, magnesium hydroxide for use herein may also be a nature product magnesium hydroxide (natural magnesium hydroxide) from a raw mineral brucite, and it may give a resin composition satisfying the specifications of the UL standard such as the flame retardancy, the tensile properties, the heat deformation resistance and the low-temperature characteristics, and is therefore advantageous for reducing the production cost.

The metal hydroxide such as magnesium hydroxide is preferably so selected, from the viewpoint of the dispersibility thereof in resin component, that its mean particle size (median diameter according to laser diffraction/scattering method) is preferably from 0.3 to 7 μm, more preferably from 0.5 to 5 μm, and its BET specific surface area is preferably from 2 to 20 m$^2$/g, more preferably from 3 to 15 m$^2$/g.

The metal hydroxide for use herein may be a grade with no surface treatment, but from the viewpoint of the dispersibility thereof, it is preferably a grade surface-treated with a surface-treating agent, for example, a fatty acid such as stearic acid or oleic acid, a phosphate, a silane coupling agent, a titanate coupling agent or aluminium coupling agent.

The blend ratio of the metal hydroxide is from 40 to 250 parts by weight, with respect to 100 parts by weight of the resin component, preferably from 50 to 240 parts by weight, more preferably from 80 to 200 parts by weight. When the blend ratio of the metal hydroxide is too low, then the flame retardancy may be insufficient, but when too high, the melt torque of the flame-retardant resin composition may be high and it is unfavorable in point of the extrusion shapability thereof and the tensile elongation at break may lower.

If desired, an inorganic flame retardant or flame retardation promoter such as antimony trioxide, zinc stannate, zinc hydroxystannate, zinc borate, zinc carbonate, basic magnesium carbonate; a nitrogen flame retardant such as melamine cyanurate; a phosphorus flame retardant such as condensed phosphate may be added to the flame-retardant resin composition of the present invention. A small amount of a halogen flame retardant may be added to the flame-retardant resin composition of the present invention, depending on its use, but in general, a halogen flame retardant is preferably not added thereto.

Optionally and if desired, known additive chemicals such as lubricant, antioxidant, working stabilizer, hydrolysis inhibitor, heavy metal inactivator, colorant, filler, reinforcing agent, foaming agent may be added to the flame-retardant resin composition of the present invention.

The flame-retardant resin composition of the present invention may be prepared by mixing a resin component, a metal hydroxide and other optional component in a known melt mixer such as open roll, Banbury mixer, pressure kneader, single-screw or multi-screw mixer. The flame-retardant resin composition of the present invention may be shaped into pellets.

The flame-retardant resin composition of the present invention may form a coating layer for insulated wires, or may form an insulation tube. In such a case, it may form a coating layer and an insulation tube having excellent characteristics such as tensile characteristics and flame retardancy even though it is not crosslinked.

On the other hand, in case where the coating layer and the insulation tube formed of the flame-retardant resin composition of the present invention is desired to be crosslinked, it may be crosslinked. Concretely, using the flame-retardant resin composition of the present invention, an insulated wire, an insulated shielded wire, an insulated cable and an in insulation tube are produced, and they are irradiated with ionizing radiations such as accelerated electron beams or γ-ray's, whereby the coating layer and the insulation tube may be crosslinked. When an organic peroxide is added to the flame-retardant resin composition of the present invention and heated, then the coating layer and the insulation tube may be crosslinked. For the crosslinking treatment, a polyfunctional monomer may be previously added to the flame-retardant resin composition. The crosslinking treatment may improve the characteristics such as tensile characteristics and heat resistance.

The flame-retardant resin composition of the present invention is favorably used for applications to coating of wires. The insulated wire has a structure where an insulating coating layer is formed on a conductor. The conductor may be a twisted bundle of plural uncoated wire strands. The flame-retardant resin composition of the present invention may form a coating layer of an insulated wire by extruding the composition onto a conductor to coat it, using a melt extruder.

The shielded wire is a shielded wire, and its typical example is a coaxial cable. In case where the shielded wire is a mono-core wire, it is so designed that the outer surface of the core conductor is coated with an insulating coating, and its outside is coated with a braided wire armor, and is further coated with an insulating coating layer as the outer coating. The flame-retardant resin composition of the present invention may form a coating layer of a conductor and, in addition, may form an insulating coating layer of an outer coating. A multi-core shielded wire has a structure in which plural cables are coated with a braided wire armor as a whole, and further coated with an insulating coating layer as an outer coating, or a structure in which mono-cores are individually coated with a braided wire armor to thereby be shielded and then are bundled up, and the bundle is coated with an outer insulating coating. The outer coating may be a coating layer formed of the flame-retardant resin composition of the present invention.

When a coating layer formed of the flame-retardant resin composition of the present invention is disposed as the outer coating of the mono-core or multi-core insulated wire, then an insulted wire may be obtained. The multi-core insulated cable includes a flat cable.

Various wires such as insulated wires having a coating layer formed of the flame-retardant resin composition of the present invention satisfy the requirements of the UL standard, and in particular, they have high flame retardancy that passes the vertical wire flame test VW-1. The coating layer is excellent not only in the initial tensile strength and tensile elongation at break, but also in the tensile characteristics after thermal aging. Regarding the tensile characteristics of the coating layer, the tensile strength may be at least 10.3 MPa, or from 10.5 to 15.0 MPa in many cases, and the tensile elongation at break may be at least 100%, or from 110 to 200% in many cases. In a thermal aging test where it is left in a gear oven at 121° C. for 168 h ours, the coating layer may have a tensile strength retention of at least 70%, preferably at least 80%, and a tensile elongation retention at break of at least 65%, preferably at least 75%.

The wire having a coating layer formed of the flame-retardant resin composition of the present invention may have a heat deformation retention of at least 50%, preferably at least 55%, as determined as follows: A wire sample is set in a gear oven at 121° C., preheated for 60 minutes, and pressed with a disc tool having a weight of 250 g and an outer diameter of 9.5 mm for 10 minutes from its top, and the deformation retention of the coating layer is measured.

In the wire having a coating layer formed of the flame-retardant resin composition of the present invention, the coating layer does not crack under the following condition: A wire sample is left in a low-temperature chamber at −10° C. for 1 hour, and then wound around a metal bar having the same outer diameter as that of the sample at least 10 times at −10° C.

The wire having a coating layer formed of the flame-retardant resin composition of the present invention has an insulation resistance of at least 100 mΩ·km, tested as follows: According to JIS C3005, a wire sample (10 m long) is dipped in grounded water for 1 hour, and a direct current voltage of 500 V is applied between the conductor and water for 3 minutes under the dipping state, then the insulation resistance is measured with a high-performance insulation resistance tester, and this is converted into a value per km.

The insulated wire according to the present invention shows flame retardancy that passes the vertical wire flame test of the UL standard, for example, when a coating layer of the flame-retardant resin composition having a thickness of 0.15 to 0.80 mm is formed around a conductor having an outer diameter of 1 mm or less.

The details of the methods for measuring the characteristics are described in Examples, and most of them are according to the UL standard. In other words, the wire insulation-coated with the flame-retardant resin composition of the present invention is favorable for inner wiring inside instruments satisfying the safety standard of the UL standard, and is characterized in that it is ecological while ensuring the safety for fire prevention or the like.

The flame-retardant resin composition of the present invention may be formed into an insulation tube by melt-extruding it into a tubular shaped article. When the insulation tube is expanded in its radial direction under heat and when its shape is solidified by cooling, then a shrinkable tube may be obtained.

EXAMPLES

The present invention will be described more in detail with reference to the following Examples and Comparative Examples, however, the present invention should not be limited to those Examples. Methods for evaluating the physical properties and the characteristics are mentioned below.

(1) Evaluation of Flame Retardancy

According to UL1581, five samples are tested in a VW-1 vertical test, and when all those five samples could pass the test, then the composition is judged as "pass". The test standard is as follows: The flame is applied to each sample for a total of five 15-second application, and within 60 seconds, the fire is extinguished; and in this case, when the absorbent cotton laid below it is not ignited by the burning and dropping sample and the kraft paper set on the sample is neither burned nor scorched, then the sample passes the test. Regarding the composition of which five those samples all have passed the test, the mean value of the longest firing time in every test (mean value of the five samples) is mentioned.

(2) Evaluation of Tensile Characteristics

A coating layer is subjected to a tensile test (pulling speed=500 mm/min, reference line distance=20 mm, temperature=23° C.). Three samples are tested for the tensile strength and the tensile elongation at break; and the data are averaged to obtain a mean value. According to the UL standard, the samples having a tensile strength of at least 10.3 MPa and having a tensile elongation at break of at least 100% are judged as "pass".

(3) Evaluation of Heat Aging Resistance

Heat aging resistance is evaluated as follows: A coating layer is thermally aged, as left in a gear oven at 121° C. for 168 hours, and then subjected to the tensile test under the same condition as above. According to the UL standard, the samples having an elongation retention [=100×(elongation after aged/elongation before aged)] of at least 65% and having a tensile strength retention [=100×(tensile strength after aged/tensile strength before aged)] of at least 70% are judged as "pass".

(4) Evaluation of Heat Deformation Resistance

A wire sample is set in a gear oven at 121° C., and pre-heated for 60 minutes, and then this is pressed with a disc tool having a weight of 250 g and an outer diameter of 9.5 mm for 10 minutes from its top. The samples in which the deformation retention of the insulator [=100×(thickness after the test/thickness before the test)] is at least 50% are judges as "pass".

(5) Evaluation of Low-Temperature Characteristics

Samples of an insulating wire, a shielded wire and an insulation tube are left in a low-temperature changer at −10° C. for 1 hour, and then wound around a metal bar having the same outer diameter as that of the sample at least 10 times at −10° C., and the samples are visually checked for cracking of the coating layer. The samples with no crack are evaluated as "pass" in point of the low-temperature characteristics.

(6) Evaluation of Insulation Resistance

According to JIS C 3005, a wire (10 m long) is dipped in grounded water for 1 hour, and a direct current voltage of 500 V is applied between the conductor and water for 3 minutes under the state of dipping the sample, then the insulation resistance is measured with a high-performance insulation resistance tester, and this is converted into a value per km. Samples having an insulation resistance of at least 100 MΩ·km are judged to have high reliability for the electric insulation capability.

Examples 1 to 11

Using a twin-screw mixer (45 mmφ, L/D=42), components were melt-mixed in the blend ratio as in Table 1, then melt-extruded as strands, and the melt strands are cooled and cut into pellets. To the resin composition shown in Table 1, added, as common additives, were 0.5 parts by weight of a lubricant, oleylamide and 1 part by weight of an antioxidant, pentaerythritol-tetrakis [3-(3,5-di-t-butyl-4-hydroxyphenyl) propionate], with respect to 100 parts by weight of the resin component.

Using a melt extruder (30 mmφ, L/D=24), the pellets of the resin composition shown in Table 1 were melt-extruded onto a soft copper wire of twisted 7 conductors (outer diameter, 0.48 mm) having a nude wire diameter of 0.16 mm so as to have a coating thickness of 0.45 mm, thereby obtaining an insulated wire. All the insulated wires had an insulation resistance of at least 100 mΩ·km, and had good insulating capability. The test results of the other characteristics are shown in Table 1.

TABLE 1

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| TPU | | | | | | | | | | | | |
| (1) adipate-type TPU | JIS hardness = A80 | — | — | — | — | 60 | — | — | — | — | — | — |
| (2) PTMG-type TPU | JIS hardness = A80 | — | — | — | — | — | — | — | — | — | — | — |
| (3) pc-type TPU | JIS hardness = A80 | — | — | — | — | — | — | — | — | — | — | — |
| (4) PTMG-type TPU | JIS hardness = A85 | 75 | 50 | 70 | 50 | — | — | — | 60 | — | 10 | — |
| (5) PC-type TPU | JIS hardness = A85 | — | — | — | — | — | — | 50 | — | — | — | 50 |
| (6) adipate-type TPU | JIS hardness = A85 | — | — | — | — | — | — | — | — | — | — | — |
| (7) adipate-type TPU | JIS hardness = A90 | — | — | — | — | — | 60 | — | — | 40 | — | — |
| (8) PTMG-type TPU | JIS hardness = A98 | — | — | — | — | — | — | — | — | — | 30 | — |
| EVA | | | | | | | | | | | | |
| (9) EVA-1 | VA = 80 wt. % | 25 | 50 | — | — | 40 | 40 | — | 40 | — | 30 | 40 |
| (10) EVA-2 | VA = 70 wt. % | — | — | 30 | 50 | — | — | 50 | — | 40 | — | — |
| (11) EVA-3 | VA = 41 wt. % | — | — | — | — | — | — | — | — | — | — | — |

TABLE 1-continued

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Modified Polymer | | | | | | | | | | | | |
| (16) modified EVA | | — | — | — | — | — | — | — | — | 20 | — | — |
| (17) modified EVA | | — | — | — | — | — | — | — | — | — | 30 | — |
| (18) modified styrene elastomer | | — | — | — | — | — | — | — | — | — | — | 10 |
| Metal Hydroxide | | | | | | | | | | | | |
| (12) synthetic magnesium hydroxide | | 180 | 150 | 200 | 120 | 150 | 160 | 130 | — | 120 | 150 | 100 |
| (13) natural magnesium hydroxide | | — | — | — | — | — | — | — | 120 | — | — | — |
| (14) organic peroxide | | — | — | — | — | — | — | — | — | — | — | — |
| (15) crosslinking promoter | | — | — | — | — | — | — | — | — | — | — | — |
| Vertical Wire Flame Test VW-1 | mean firing time (s) | 28 | 25 | 33 | 20 | 25 | 30 | 30 | 15 | 25 | 25 | 30 |
| | decision | passed | passed | passed | passed | passed | passed | passed | passed | passed | passed | passed |
| Coating Layer Tensile Test (initial) | tensile strength (MPa) | 14.0 | 12.5 | 13.7 | 11.8 | 13.3 | 12.9 | 12.9 | 13.0 | 14 | 14.5 | 15 |
| | elongation at break (%) | 168 | 126 | 140 | 120 | 155 | 180 | 180 | 150 | 135 | 130 | 140 |
| Coating Layer Tensile Test (after aged) 121° C. × 168 hrs | tensile strength retention (%) | 98 | 87 | 90 | 85 | 85 | 92 | 92 | 85 | 90 | 89 | 96 |
| | elongation retention (%) | 90 | 88 | 91 | 83 | 90 | 87 | 87 | 88 | 88 | 90 | 85 |
| Heat Deformation Retention (%) | | 65 | 96 | 90 | 98 | 85 | 60 | 60 | 63 | 85 | 93 | 90 |
| −10° C. Own-Diameter Winding Test | | passed | passed | passed | passed | passed | passed | passed | passed | passed | passed | passed |

(Footnotes)
(1) Adipate-type TPU (JIS hardness = A80): Thermoplastic polyurethane elastomer having an adipate-type soft segment and having a JIS hardness of A80
(2) PTMG-type TPU (JIS hardness = A80): Thermoplastic polyurethane elastomer having a polytetramethylene glycol-type soft segment and having a JIS hardness of A80
(3) PC-type TPU (JIS hardness = A80): Thermoplastic polyurethane elastomer having a polycarbonate-type soft segment and having a JIS hardness of A80
(4) PTMG-type TPU (JIS hardness = A85): thermoplastic polyurethane elastomer having a polytetramethylene glycol-type soft segment and having a JIS hardness of A85
(5) PC-type TPU (JIS hardness = A85): Thermoplastic polyurethane elastomer having a polycarbonate-type soft segment and having a JIS hardness of A85
(6) Adipate-type TPU (JIS hardness = A85): Thermoplastic polyurethane elastomer having an adipate-type soft segment and having a JIS hardness of A85
(7) Adipate-type TPU (JIS hardness = A90): Thermoplastic polyurethane elastomer having an adipate-type soft segment and having a JIS hardness of A90.
(8) PTMG-type TPU (JIS hardness = A98): Thermoplastic polyurethane elastomer having a polytetramethylene glycol-type soft segment and having a JIS hardness of A98.
(9) EVA-1: Ethylene-vinyl acetate copolymer having a vinyl acetate unit content of 80% by weight [Mooney viscosity (ML 1 + 4, 100° C.) = 28].
(10) EVA-2: Ethylene-vinyl acetate copolymer having a vinyl acetate unit content of 70% by weight [Mooney viscosity (ML 1 + 4, 100° C.) = 27].
(11) EVA-3: Ethylene-vinyl acetate copolymer having a vinyl acetate unit content of 41% by weight (MFR = 2 g/10 min).
(12) Synthetic magnesium hydroxide: Mean particle size = 0.8 μm, BET specific surface area = 6 m$^2$/g, Aminosilane-processed product, Synthetic product
(13) Natural magnesium hydroxide: Mean particle size = 0.3 μm, aminosilane-processed product, natural product
(14) Organic peroxide: 2,5-dimethyl-2,5-di (t-butylperoxy) hexane
(15) Crosslinking promoter: Triethylene glycol dimethacrylate
(16) Modified EVA: Copolymer of ethylene, ethyl acrylate and maleic anhydride (MFR = 7 g/10 min) (190° C., 2.16 kg), (density 0.95 g/cm$^3$)
(17) Modified EVA: Copolymer of ethylene and 12 wt. % glycidyl methacrylate and 5 wt. % vinyl acetate (MFR = 3 g/10 min (190° C., 2.16 kg))
(18) Modified styrene elastomer: Maleic anhydride-modified styrene-ethylene/butadiene-styrene copolymer (styrene content 30 wt. %, MFR = 5 g/10 min (230° C., 2.16 kg))

Consideration

As shown in Table 1, the insulated wires (Examples 1 to 11) coated with a flame-retardant resin composition containing 120 to 200 parts by weight of synthetic magnesium hydroxide surface-processed with an aminosilane coupling agent and having a mean particle size of 0.8 μm with respect to 100 parts by weight of a resin component containing 40 to 75 parts by weight of a thermoplastic polyurethane elastomer, 25 to 50 parts by weight of an ethylene-vinyl acetate copolymer (vinyl acetate unit content=70 to 80% by weight) show high flame retardancy that passes the vertical wire flame test VW-1 of the UL standard, in which the tensile strength of the coating layer (insulator) is at least 10.3 MPa, the tensile elongation at break thereof is at least 100%, the tensile strength retention thereof after aged at 121° C. for 7 days is at least 70%, and the tensile elongation retention at break thereof is at least 65%, and even in a thermal deformation test, the retention is at least 50%, and it is understood that the insulated wires pass the test in point of all their characteristics.

In addition, it is understood that these insulated wires are not cracked at their coating in the own-diameter winding test at −10° C.

It is understood that, when an aminosilane coupling agent-processed natural magnesium hydroxide having a mean particle size of 3 μm is used (Example 8) in place of the above-mentioned synthetic magnesium hydroxide, the wires pass the vertical wire flame test VW-1 of the UL standard in point of all their characteristics. It is also under stood that, when 0 to 30 parts by weight of a modified polymer as shown in Table 1 is used in each of Examples 9 to 10 except 1 to 8, the wires pass the vertical wire flame test VW-1 of the UL standard. Furthermore, it is understood that, even when the flame-retardant resin composition containing 100 parts by weight of synthetic magnesium hydroxide as shown in Table 1 is used in Example 11, the wire pass the vertical wire flame test VW-1 of the UL standard.

Comparative Examples 1 to 10

Insulated wires were produced in the same manner as in Examples 1 to 8 except that resin compositions having a blend ratio as in Table 2 were used and that especially in Comparative Example 8, the insulated wire was thermally-crosslinked by adding 0.04 parts by weight of the organic peroxide and 0.08 parts by weight of the crosslinking promoter. The results are shown in Table 2.

TABLE 2

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| TPU | | | | | | | | | | | |
| (1) adipate-type TPU | JIS hardness = A80 | — | — | — | — | — | — | — | — | — | — |
| (2) PTMG-type TPU | JIS hardness = A80 | 100 | — | 30 | 60 | 70 | 55 | — | 60 | — | — |
| (3) pc-type TPU | JIS hardness = A80 | — | — | — | — | — | — | — | — | — | 70 |
| (4) PTMG-type TPU | JIS hardness = A85 | — | — | — | — | — | — | — | — | — | — |
| (5) PC-type TPU | JIS hardness = A85 | — | — | — | — | — | — | — | — | — | — |
| (6) adipate-type TPU | JIS hardness = A85 | — | — | — | — | — | — | — | — | 30 | — |
| (7) adipate-type TPU | JIS hardness = A90 | — | — | — | — | — | — | — | — | — | — |
| (8) PTMG-type TPU | JIS hardness = A98 | — | — | — | — | — | — | — | 60 | — | — |
| EVA | | | | | | | | | | | |
| (9) EVA-1 | VA = 80 wt. % | — | 100 | 70 | — | 30 | 45 | 40 | — | 70 | — |
| (10) EVA-2 | VA = 70 wt. % | — | — | — | — | — | — | — | — | — | — |
| (11) EVA-3 | VA = 41 wt. % | — | — | — | 40 | — | — | — | 40 | — | 30 |
| Metal Hydroxide | | | | | | | | | | | |
| (12) synthetic magnesium hydroxide | | 180 | 200 | 220 | 190 | 30 | 260 | 120 | 100 | 120 | 150 |
| (13) natural magnesium hydroxide | | — | — | — | — | — | — | — | — | — | — |
| (14) organic peroxide | | — | — | — | — | — | — | — | 0.04 | — | — |
| (15) crosslinking promoter | | — | — | — | — | — | — | — | 0.08 | — | — |
| Vertical Wire Flame Test VW-1 | mean firing time (s) | kraft paper burnt | 20 | kraft paper burnt | kraft paper burnt | 60< | 9 | 30 | kraft paper burnt | — | kraft paper burnt |
| | decision | failed | passed | failed | failed | failed | passed | passed | failed | — | failed |
| Coating Layer Tensile Test (initial) | tensile strength (MPa) | — | — | 15.5 | 9.0 | 14.2 | 8.0 | — | 14.8 | — | — |
| | elongation at break (%) | — | — | 145 | 110 | 169 | 75 | 70 | 180 | 75 | — |
| Coating Layer Tensile Test (after aged) 121° C. × 168 hrs | tensile strength retention (%) | — | melted | 94 | melted | 90 | 77 | — | 95 | — | — |
| | elongation retention (%) | — | — | 92 | — | 89 | 60 | — | 91 | — | — |
| Heat Deformation Retention (%) | | — | 0 | 98 | 0 | 87 | 89 | — | 97 | — | — |
| −10° C. Own-Diameter Winding Test | | — | failed | passed | passed | passed | passed | — | passed | — | — |

(Footnotes)
Same as the footnotes of Table 1.

Consideration

In case where a PTMG-type thermoplastic polyurethane elastomer alone was used as the resin component (Comparative Example 1), the flame retardancy was insufficient. In case where an ethylene-vinyl acetate copolymer (vinyl acetate unit content=80% by weight) alone was used as the resin component (Comparative Example 2), the heat deformation resistance was in failure, and the coating cracked in the low-temperature own-diameter winding test and was in failure.

In case where a resin composition in which the proportion of the ethylene-vinyl acetate copolymer (vinyl acetate unit content=80% by weight) in the resin component was 70% by weight was used (Comparative Example 3), the flame retardancy was insufficient.

In case where EVA-3 having a vinyl acetate unit content of 41% by weight was used as the ethylene vinyl acetate copolymer (Comparative Example 4), the flame retardancy was insufficient and, in addition, the initial tensile strength was less than 10.3 MPa and was low, and the heat deformation resistance was in failure.

In case where the blend ratio of magnesium hydroxide was too low (Comparative Example 5), the kraft paper was burnt, and the sample failed the vertical wire flame test VW-1. In case where the blend ratio of magnesium hydroxide was too high (Comparative Example 6), the sample passed the vertical wire flame test VW-1, but its tensile characteristics were poor.

In case where EVA-3 having a vinyl acetate unit content of 41% by weight was used as the ethylene-vinyl acetate copolymer and when the sample was thermally crosslinked with an organic peroxide combined with a crosslinking promoter (Comparative Example 8), the sample failed the vertical wire flame test VW-1.

In case where the ratio by weight of the adipate-type thermoplastic polyurethane elastomer (JIS hardness=A85) in the resin component was 30% by weight and where the blend ratio of magnesium hydroxide was 120% by weight (Comparative Example 9), the tensile elongation at break of the coating layer (insulator) was lower than 100%, and the mechanical properties of the sample were poor, and therefore, measurement of the other characteristics thereof was omitted.

In case where EVA-3 having a vinyl acetate content of 41% by weight was used as the ethylene-vinyl acetate copolymer and where the ratio by weight of the polycarbonate-type thermoplastic polyurethane elastomer in the resin component was increased to 70% by weight (Comparative Example 10), the sample failed to pass the vertical wire flame test VW-1. Measurement of the other characteristics was omitted.

Examples 2 to 14

Production and Evaluation of Insulated Shielded Wire

A resin composition prepared by adding 2 parts by weight of an azobiscarbonamide foaming agent and 1 part by weight of pentaerythritol-tetrakis [3-(3,5-di-t-butyl-4-hydroxyphenyl) propionate] to 100 parts by weight of low-density polyethylene (density=0.921 g/m$^3$, MFR=5 g/10 min) was applied onto a soft copper wire of twisted 7 conductors (outer diameter, 0.38 mm) having a nude wire diameter of 0.127 mm to a coating thickness of 0.45 mm, thereby obtaining an insulated wire, in a mode of foaming extrusion using a melt extruder (30 mmφ, L/D=24), thereby forming a polyethylene foam layer, and then a tin-plated soft copper wire having an outer diameter of 0.10 mm was wound on its outer peripheral surface thereby forming a cross-wound shield layer. Using a melt extruder (45 mmφ, L/D=24; compression ratio=2.5; fullflight type), the flame-resistant resin composition of above Examples 4 and 9 was applied onto the outer peripheral surface of the shield layer in a mode of extrusion coating to form an outer coating layer, thereby producing an insulated shielded wire having an outer diameter of 2.0 mm. The foaming degree of the above polyethylene foam layer was so controlled that the electrostatic capacity between the center conductor and the outer conductor could be 100±5 pF/m.

The insulated shielded wire passed the vertical wire flame test VW-1. It was known that the mean value of the longest firing time of five tested samples was 3 seconds and the flame retardancy was excellent, and the heat deformation retention was 87% and the heat deformation resistance was also excellent. It was also understood that the tensile strength of the outer coating was 13.0 MPa, and the tensile elongation at break was 145%, and the physical properties were excellent, and the tensile strength retention after aged at 121° C. for 7 days was 92% and the elongation retention at break was 92%, and the heat aging resistance was excellent. Further, in the own-diameter winding test at −10° C., the coating did not crack at all, and it was understood that the low-temperature characteristics were excellent. The results are shown in Table 3.

Example 14

Production and Evaluation of Insulation Tube

Using a melt extruder (30 mmφ, L/D=24), the flame-retardant resin composition pellets of Example 5 were extruded and formed into a tube having an inner diameter of 6.4 mmφ and a wall thickness of 0.5 mm, thereby obtaining an insulation tube. A metal bar having the same diameter as the inner diameter thereof was inserted into the insulation tube, and subjected to the vertical wire flame test VW-1, and this passed the test. The mean value of the longest firing time of five test samples was 10 seconds, and it was known that the flame retardancy was excellent. Similarly, a metal bar having the same diameter as the inner diameter of thereof was inserted into the insulation tube, and tested for heat deformation resistance. The heat deformation retention was 84%, and it was understood that the heat deformation resistance was excellent.

The tensile strength of the insulation tube was 14.2 MPa, and the tensile elongation at break thereof was 155%, and the mechanical properties were excellent. The tensile strength retention after aged at 121° C. for 7 days was 86%, and the elongation retention at break was 87%, and it was known that the heat aging resistance was excellent. Further, in the −10° C. own-diameter winding test, the outer coating did not crack at all, and it was known that the low-temperature characteristics were excellent. The results are shown in Table 3.

TABLE 3

|  |  | Example 12 | Example 13 | Example 14 |
|---|---|---|---|---|
| Form of Insulator |  | Shielded wire | Shielded wire | Insulation tube |
| Resin Composition |  | Same as in Example 4 | Same as in Example 9 | Same as in Example 5 |
| Vertical Wire Flame Test VW-1 | mean firing time (sec) | 15 | 14 | 10 |
|  | decision | passed | passed | passed |
| Insulator Tensile Test (initial) | tensile strength (MPa) | 13.0 | 14.5 | 14.2 |
|  | elongation at break (%) | 145 | 140 | 155 |
| Insulator Tensile Test (after aged) 121° C. × 168 hrs | tensile strength retention (%) | 92 | 93 | 86 |
|  | elongation retention (%) | 92 | 95 | 87 |
| Heat Deformation Retention (%) |  | 87 | 87 | 84 |
| −10° C. Own-Diameter Winding Test |  | passed | passed | Passed |

INDUSTRIAL APPLICABILITY

The flame-retardant resin composition of the present invention may be utilized as a coating material for wires, for example, as insulated wires, insulated shielded wires, insulating cables. The flame-retardant resin composition of the present invention may be utilized, as shaped into insulation tubes favorable for applications to connection or insulation of wires.

While the present invention has been described in detail and with reference to specific embodiments thereof, it will be apparent to one skilled in the art that various changes and modifications can be made therein without departing from the spirit and scope thereof. The present application is based on a Japanese Patent Application No. 2005-336269 filed on Nov. 21, 2005, the content of which is incorporated herein by reference.

The invention claimed is:

1. A flame-retardant resin composition comprising:
   a resin component comprising (A) a thermoplastic polyurethane elastomer having, as measured according to JIS K 7311, a JIS hardness of A50 to A96, and (B) an ethylene-vinyl acetate copolymer having a vinyl acetate unit content of 50 to 90% by weight, wherein a ratio by weight (A:B) is within a range of 40:60 to 90:10; and
   (D) a metal hydroxide in a ratio of 40 to 250 parts by weight with respect to 100 parts by weight of the resin component,
   wherein the flame-retardant resin composition is formed without performing a crosslinking treatment.

2. The flame-retardant resin composition according to claim 1, wherein the metal hydroxide is a synthetic magnesium hydroxide or a natural magnesium hydroxide or a mixture thereof.

3. An insulated wire comprising:
   a conductor coated with the flame-retardant resin composition according to claim 1.

4. The insulated wire according to claim 3, wherein the conductor has an outer diameter of 1 mm or less, and a coating layer of the flame-retardant resin composition has a thickness of 0.15 to 0.80 mm and has flame retardancy that passes the vertical wire flame test VW-1 of the UL standard.

5. An insulated shielded wire comprising, as an outer coating, a coating layer formed from the flame-retardant resin composition according to claim 1.

6. An insulated cable comprising, as an outer coating of a mono-core insulated wire or a multi-core insulated wire, a coating layer formed from the flame-retardant resin composition according to claim 1.

7. An insulation tube formed from the flame-retardant resin composition according to claim 1.

8. The flame-retardant resin composition according to claim 1, wherein the thermoplastic polyurethane elastomer has a melt flow rate measured according to JIS K 7210 at a temperature of 210° C. under a test load of 5000 g of from 0.1 to 100 g/10 min.

9. The flame-retardant resin composition according to claim 1, wherein the flame-retardant resin composition has such flame-retardancy that, when the flame-retardant resin composition is coated on a conductor having an outer diameter of 1 mm or less to form an insulating wire having a coating layer of the flame-retardant resin composition having a thickness of 0.15 to 0.80 mm, the flame-retardant resin composition gives flame retardancy to the insulating wire that passes a vertical wire flame test VW-1 of the UL standard.

10. A flame-retardant resin composition comprising:
a resin component comprising:
(A) 30 to 90 parts by weight of a thermoplastic polyurethane elastomer having, as measured according to JIS K 7311, a JIS hardness of A98 or less;
(B) 70 to 10 parts by weight of an ethylene-vinyl acetate copolymer having a vinyl acetate unit content of 50 to 90% by weight; and
(C) 0 to 40 parts by weight of at least one polymer selected from the following copolymers (C1) to (C3):
(C1) an acid anhydride-modified ethylene-unsaturated carboxylic acid derivative copolymer,
(C2) an epoxy group-having ethylene-olefin copolymer, and
(C3) an acid anhydride-modified styrene elastomer, and provided that the total amount of components (A), (B) and (C) is 100 parts by weight,
(D) a metal hydroxide in a ratio of 40 to 250 parts by weight with respect to the total amount of 100 parts by weight of the resin component containing (A), (B) and (C),
wherein the flame-retardant resin composition is formed without performing a crosslinking treatment.

11. The flame-retardant resin composition according to claim 10, wherein the metal hydroxide is a synthetic magnesium hydroxide or a natural magnesium hydroxide or a mixture thereof.

12. An insulated wire comprising:
a conductor coated with the flame-retardant resin composition according to claim 10.

13. The insulated wire according to claim 12, wherein the conductor has an outer diameter of 1 mm or less, and a coating layer of the flame-retardant resin composition has a thickness of 0.15 to 0.80 mm and has flame retardancy that passes the vertical wire flame test VW-1 of the UL standard.

14. An insulated shielded wire comprising, as an outer coating, a coating layer formed from the flame-retardant resin composition according to claim 10.

15. An insulated cable comprising, as an outer coating of a mono-core insulated wire or a multi-core insulated wire, a coating layer formed from the flame-retardant resin composition according to claim 10.

16. An insulation tube formed from the flame-retardant resin composition according to claim 10.

17. The flame-retardant resin composition according to claim 10, comprising 40 to 80 parts by weight of the component (A), 20 to 60 parts by weight of the component (B), and 10 to 30 parts by weight of the component (C).

18. The flame-retardant resin composition according to claim 10, wherein the thermoplastic polyurethane elastomer has a melt flow rate measured according to JIS K 7210 at a temperature of 210° C. under a test load of 5000 g of from 0.1 to 100 g/10 min.

19. The flame-retardant resin composition according to claim 1, wherein the ethylene-vinyl acetate copolymer has a melt flow rate measured according to JIS K 7210 at a temperature of 190° C. under a test load of 2160 g of from 0.1 to 100 g/10 min.

20. The flame-retardant resin composition according to claim 10, wherein the ethylene-vinyl acetate copolymer has a melt flow rate measured according to JIS K 7210 at a temperature of 190° C. under a test load of 2160 g of from 0.1 to 100 g/10 min.

21. The flame-retardant resin composition according to claim 10, wherein the flame-retardant resin composition has such a property that, when the flame-retardant resin composition is coated on a conductor having an outer diameter of 1 mm or less to form an insulating wire having a coating layer of the flame-retardant resin composition having a thickness of 0.15 to 0.80 mm, the flame-retardant resin composition gives flame retardancy to the insulating wire that passes a vertical wire flame test VW-1 of the UL standard, and has a tensile strength of 10.3 MPa or more and a tensile elongation at break of 100% or more when measured under conditions of a pulling speed being 500 mm/min, a reference line distance being 20 mm and a temperature being 23° C.

* * * * *